United States Patent

[11] 3,560,698

| [72] | Inventors | Ronald E. Taylor<br>Tandridge;<br>Joseph Manuel Tanenbaum, 4 Dewborune Ave., Toronto, 10 Ontario, Canada |
|---|---|---|
| [21] | Appl. No. | 794,108 |
| [22] | Filed | Jan. 27, 1969 |
| [45] | Patented | Feb. 2, 1971 |
| [73] | Assignee | said Taylor, assignor to said Tanenbaum |

[54] ADJUSTABLE WELDING HEAD ARRANGED TO FOLLOW A LAPPED SEAM
7 Claims, 2 Drawing Figs.

[52] U.S. Cl. .................................................. 219/125, 228/32
[51] Int. Cl. .................................................. B23k 9/12
[50] Field of Search .......................................... 219/124, 125, 126, 73, 130; 228/25, 30, 32

[56] References Cited
UNITED STATES PATENTS

| 1,978,042 | 10/1934 | Dodge | 219/125X |
| 2,068,166 | 1/1937 | Dodge | 219/125 |
| 2,441,507 | 5/1948 | Peters | 219/130 |
| 2,810,063 | 10/1957 | Brashear, Jr. | 219/73X |
| 2,909,642 | 10/1959 | Landis | 219/73 |
| 3,167,636 | 1/1965 | Bosteels | 219/125 |
| 3,325,625 | 5/1967 | Ogden et al. | 219/125 |
| 3,444,352 | 5/1969 | Ogden et al. | 219/125 |

Primary Examiner—J. V. Truhe
Assistant Examiner—L. A. Schutzman
Attorney—Douglas S. Johnson ABSTRACT: A welding head assembly has a pair of rigidly connected, bifurcated, open-ended tubes with rollers which bear against one side of a plate projecting from the base plate to which it is to be welded. A weld wire emerges between the ends of the bifurcated tubes which carry a supply of flux to surround the tip of the weld wire. The assembly also has a downwardly depending arm which has a drive wheel. The arm is pivotably biassed so that the drive wheel bears against the other side of the plate with the result that the drive wheel propels the welding head assembly.

INVENTOR.
JOSEPH M. TANENBAUM
RONALD E. TAYLOR
BY
Douglas S. Johnson
Attorney

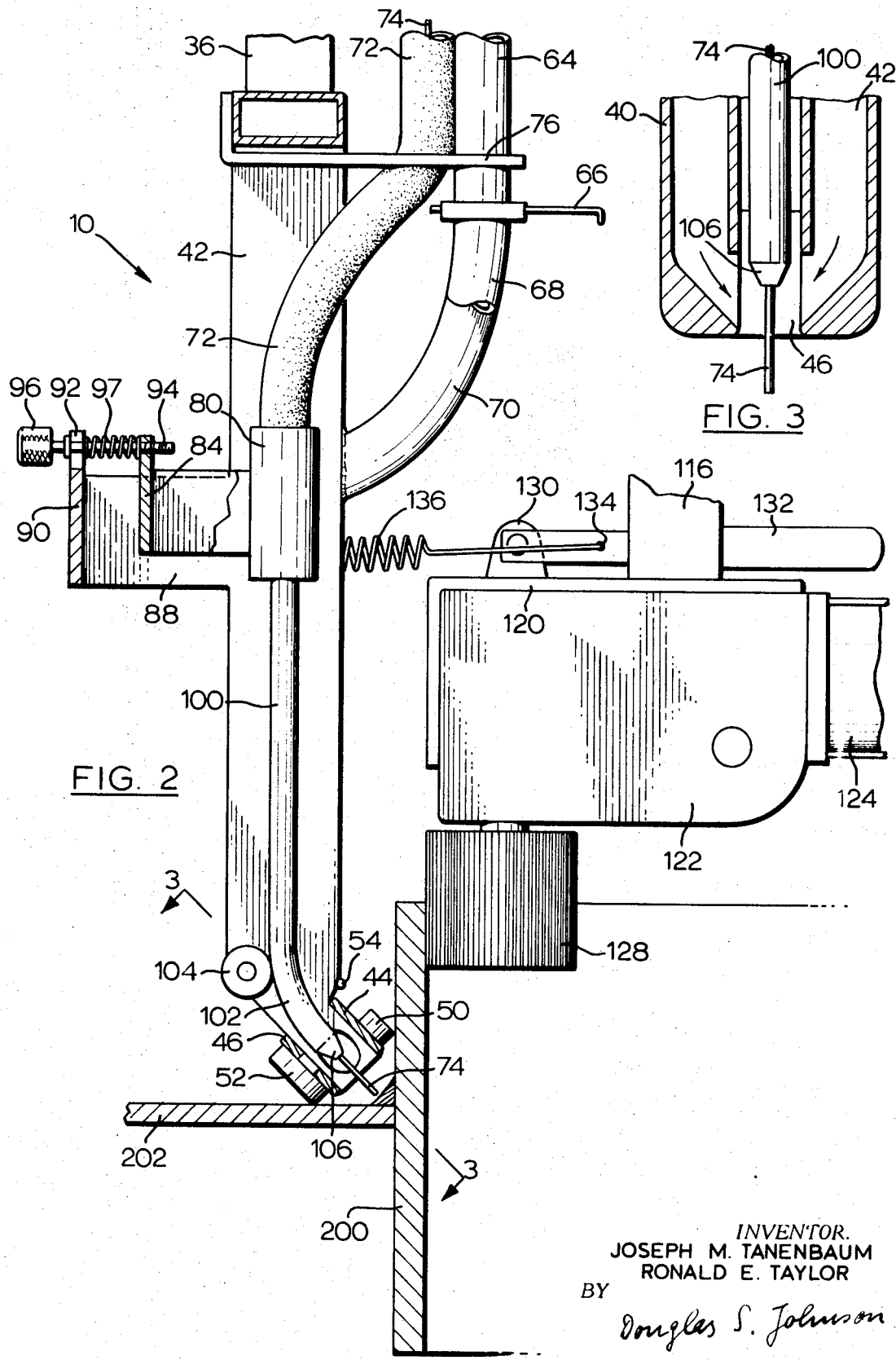

ADJUSTABLE WELDING HEAD ARRANGED TO FOLLOW A LAPPED SEAM

FIELD OF THE INVENTION

This invention relates to a welding head assembly.

DESCRIPTION OF PRIOR ART

The development of large structural steel members has been made possible because they may be fabricated economically, with the requisite strength, from plates joined together at their juncture by automatic welding.

In addition to providing the requisite frame work for a building, the webs of large structural steel members are utilized to provide passage ways for ducting. To provide for attachment of such ducting, projecting frames have been incorporated in the webs of the I-beams and channels commonly used as structural members. Automatic welding is the desirable method of securement of such frames; however, since the corners of the frames are curved to minimize stress concentration in this area, the automatic welding assembly must have guide means to follow the curved juncture of the frame and the web in which it is located.

The preferred method of welding utilizes a submerged arc, and it is necessary to ensure a complete cover of flux around the tip of the weld wire after the arc has been struck to prevent the weld metal from oxidizing which, if not prevented, would result in a weld of poor strength.

It is an object of the invention to provide an automatic welding head assembly which will travel along a projecting frame located in a corresponding aperture in a structural steel member and which will follow the juncture of the frame in the locations where is curved.

It is a further object of the invention to provide an automatic welding head assembly in which flux will be supplied around the tip of the weld wire to form a complete cover during movement of the welding head assembly along the projecting frame.

SUMMARY

The welding head assembly of the invention consists of first and second downwardly depending members, with one member pivotable and biassed towards the other so that the respective free ends of the first and second members bear against one side of a plate projecting from the base plate to which it is to be welded. The first member is formed of hollow, bifurcated arms with a weld wire protruding between the free ends of the arms. The hollow arms carry a supply of flux which emerges around the tip of the weld wire. The free end of the first member carries rollers which bear against one side of the projecting plate; the second member has a rotatable drive wheel which bears against the other side of the projecting plate, with motor means on the second member to motivate the drive wheel which in turn propels the welding head assembly along the projecting plate.

DESCRIPTION OF THE DRAWINGS

The invention will now be described in relation to the accompanying drawings, in which:

FIG. 2 is a side elevational view, partly in section, of the welding head assembly; and FIG. 3 is a sectional view taken on the lines 3—3 of FIG. 2.

DESCRIPTION OF THE PREFERRED EMBODIMENT

Figure 1:
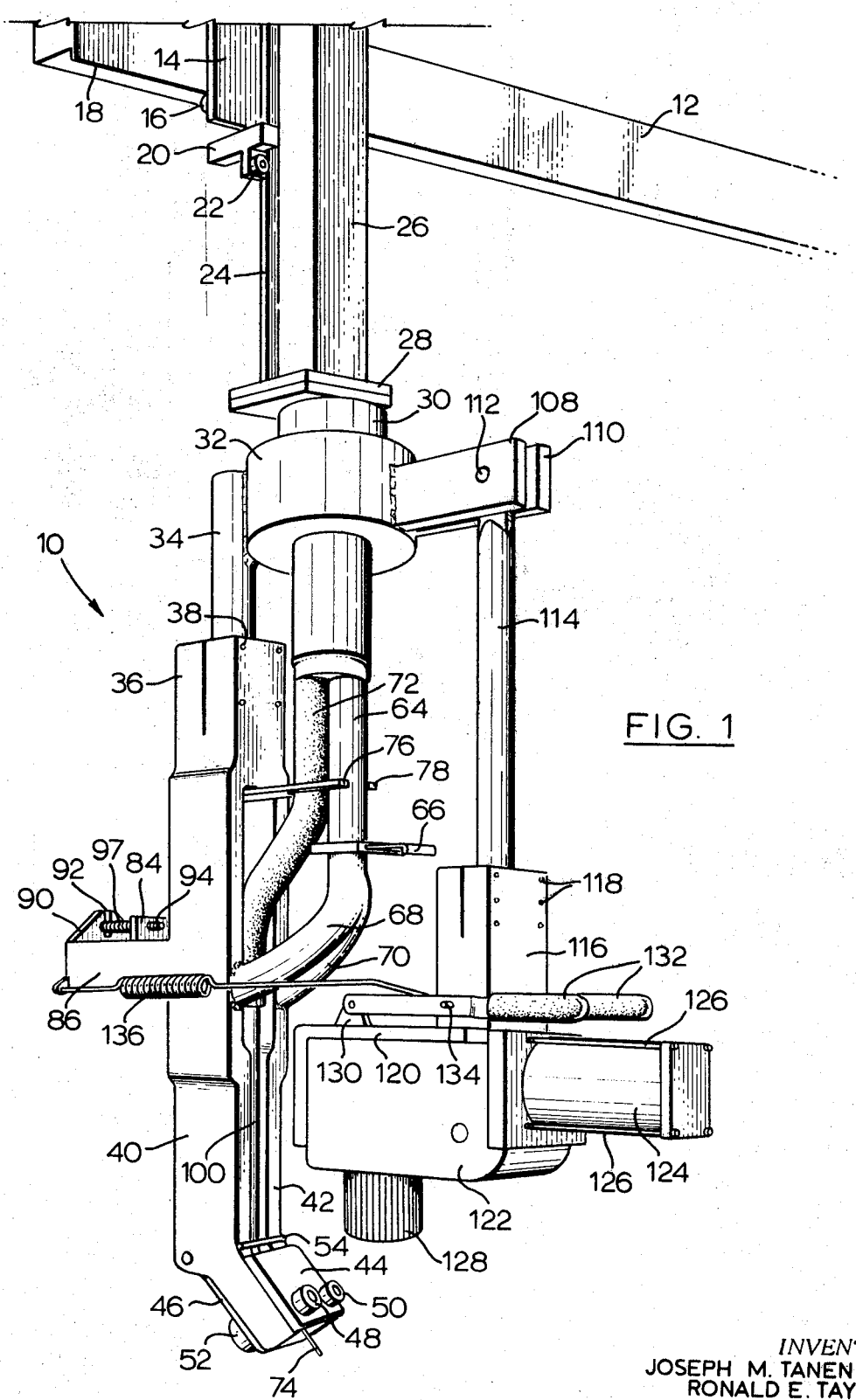
FIG. 1 is a perspective view of the welding head assembly.

The welding head assembly, generally denoted by the numeral 10, is slidably carried on a pivotably supported, horizontally disposed boom 12. A yoke 14 is movable along the boom 12, the yoke 14 having a roller 16 which engages on the inside of a downwardly disposed flange 18 positioned on the underside of the boom 12.

The welding head assembly 10 is arranged to have vertical displacement also in relation to the boom 12, and this is accomplished by cooperation between a T-member 20 secured to the underside of the yoke 14, the T-member 20 having spaced-apart rollers 22 which ride along the flange 24 of a downwardly disposed arm 26. Lock means, not shown, are provided to secure the welding head assembly 10 in the desired vertical position with respect to the boom 12.

The lower end of the arm 26 terminates in a plate 28 which forms the cover to a tubular member 30. A bearing 32 is positioned around the tubular member 30.

One end of the downwardly extending rod 34 is secured to one side of the bearing 32, see FIG. 1. The other end of the rod 34 is adjustably secured in a split sleeve 36, adjustment being achieved by releasing screws 38. The sleeve 36 is bifurcated to provide vertically disposed, open-ended spaced-apart hollow member 40 and 42, the lower portions of which are inclined downwardly at an angle of approximately 45°, as shown in FIG. 1. Opposed upper plate 44 and lower plate 46 connect the hollow members 40 and 42 at their inclined lower portions; the upper plate 44 has a pair of wheels 48 and 50, the periphery of each wheel being normal to the surface of the plate 44. The plate 46 has a single wheel 52, the periphery of which is normal to the surface of the plate 46.

The tubular member 30, which carries a supply of flux, has a restricted portion 64 at its lower end which is closed by a slidable gate 66 to control the amount of flux issuing from the restricted portion 64. Below the gate 66, the restricted portion 64 divides into a pair of tubes 68 and 70 which are connected respectively to the hollow members 40 and 42, see FIG. 1.

The tubular member 30 also carries a conventional flexible tube 72 and enclosed weld wire 74. The flexible tube 72 emerges from the tubular member 30 and passes between a pair of guides 76 and 78 which are carried by the sleeve 36. The tube 72 then travels downwards to enter a collar 80 which is located between the hollow members 40 and 42 in a position intermediate of the tubes 68 and 70. The collar 80 has an arm 82 which extends outwardly in a direction away from the tubes 68 and 70.

The arm 82 terminates in a normally disposed plate 84 which is located between a pair of plates 86 and 88 secured respectively to the hollow members 40 and 42. The plates 86 and 88 are joined by a plate 90 which has a slot 92 in which is located the threaded shank of a screw 94 which has a knurled head 96. A spring 97 surrounds that portion of the screw 96 situated between the plates 90 and 84. It will be appreciated that rotation of the screw 94 will alter the vertical displacement of the collar 80.

A copper tube 100 is secured to the collar 80 by suitable means, such as brazing. The copper tube 100 depends downwardly between the hollow members 40 and 42 and is bent as at 102 to conform with the shape of the lower portions of the hollow members 40 and 42. The copper tube 100 has a reduced end 106 from which protrudes the tip of the weld wire 74, this being received in the copper tube 100 from the flexible tube 72. The copper tube has an external wheel 104 which bears against the inner surface of the plate 46.

On the opposite side of the bearing 32 with respect to the rod 34 is a pair of horizontally disposed, spaced-apart plates 108 and 110 traversed by a pin 112. A downwardly depending rod 114 is supported on the pin 112, the lower end of the rod 114 being secured in a split sleeve 116 having releasable screws 118 for adjustment of the position of the sleeve 116 on the rod 114. The lower end of the sleeve 116 is secured to a cover plate 120 of a gear box 122 containing conventional reduction gearing. An electric motor 124 is secured in conventional manner at the side of the cover plate 120 by means of rods 126. The underside of the gear box 122 carries a serrated drive wheel 128 which is driven through the standard reduction gearing by the motor 124. The cover plate 120 of the gear box 122 has a pair of spaced-apart, upstanding lugs 130, each of which carries an individual pivotable arm 132 positioned one to each side of the sleeve 116. Each of the arms 132 has a pin 134 intermediate of its ends to which is attached one end of a spring 136, the other end of which is secured to the plate 90.

The operation of the welding head assembly 10 is illustrated more particularly in the FIGS. with respect to welding a projecting frame 200 to the web 202 of a structural section. The pivotable boom 12 is swung into position over the frame 200 and the welding head assembly 10 is adjusted for vertical displacement so that the tip of the weld wire 74 emerging from between the hollow members 40 and 42 is in close proximity to the juncture of one surface of the frame 200 and the web 202. Since the positioning of the tip of the weld wire 74 in relation to the weld area is critical in order to provide a good weld, adjustment is effected by means of rotation of the screw 96 which alters the displacement of the collar 80; as a result the end of the welding tube 100 is pivoted on the wheel 104 bearing against the inside surface of the plate 46 and the position of the tip of the weld wire 74 is altered.

The arms 132 are now pivoted on the upstanding lugs 130 so as to bring the springs 136 into tension with the result that the downwardly depending rod 114 is pivoted on the pin 112 this bringing the serrated drive wheel 128 into contact with the opposite surface of the frame 200. The gate 66 is then opened so that the flux descends through the hollow members 40 and 42 to emerge around the tip of the weld wire 74; at the same time the electric motor 124 is started and this proceeds to drive the wheel 128 through the standard reduction gearing. As a result the welding head assembly 10 follows the contour of the frame 200 as the welding operation proceeds.

We claim:

1. A welding head assembly for automatically welding a projecting plate to another plate consisting of a hollow member moveable in a predetermined horizontal plane, a weld wire projecting from said hollow member, said hollow member supplying flux therethrough and around the projecting tip of said weld wire, a further member pivotably secured to said hollow member, rotatable means on one of said members bearing against one side of said projecting plate, driven rotatable means on the other of said members, and means coupling said members together whereby the driven rotatable means on the other of said members bears against the other side of said projecting plate to propel said welding head assembly along said projecting plate, the tip of said weld wire being adjacent to the juncture of said projecting plate and said other plate to provide a welded joint.

2. A welding head assembly according to claim 1, wherein said hollow member is formed from the connection of the corresponding ends of a pair of spaced-apart tubular members, each providing a supply of flux to the tip of said weld wire.

3. A welding head assembly according to claim 1, wherein said rotatable means and said driven rotatable means comprise a pair of spaced-apart wheels bearing against said one side of said projecting plate, and at least a single, opposed wheel bearing against said other of said projecting plate, respectively.

4. A welding head assembly according to claim 3, wherein said pair of wheels and said opposed wheel are positioned on opposed sides of said weld wire tip.

5. A welding head assembly according to claim 2, wherein said weld wire is carried in a rigid tube located between said tubular members, said rigid tube having an external pivot wheel bearing against a plate connecting said tubular members adjacent their respective open ends, and means moving said rigid tube at a point removed from the tip of said weld wire with respect to said pivot wheel to pivot said tube about said pivot wheel and alter the position of the tip of said weld wire.

6. A welding head assembly according to claim 1, wherein said driven rotatable means is a serrated wheel.

7. A welding head assembly according to claim 1, wherein said driven rotatable means is supported on said second member with drive means carried on said second member to drive said driven rotatable means.